United States Patent Office 2,845,451
Patented July 29, 1958

2,845,451

PRODUCTION OF ACRYLIC ACID AND ITS FUNCTIONAL DERIVATIVES

Hans Lautenschlager, Ludwigshafen (Rhine), Herbert Friederich, Worms, Erich Henkel, Ludwigshafen (Rhine), Nikolaus von Kutepow, Karlsruhe-Rueppurr, Walter Himmele, Walldorf (Baden), and Paul Raff, Ludwigshafen (Rhine), Germany, assignors to Badische Anilin- & Soda-Fabrik Aktiengesellschaft, Ludwigshafen (Rhine), Germany No Drawing. Application June 22, 1956
Serial No. 593,053

Claims priority, application Germany June 23, 1955

7 Claims. (Cl. 260—486)

This invention relates to an improved process for the production of acrylic acid and its functional derivatives, such as esters, amides and anhydrides with other carboxylic acids, by reaction of acetylene, carbon monoxide and water or other compounds having removable hydrogen atoms in the presence of a catalyst. In particular the invention relates to a process for the production of acrylic acid and its functional derivatives in the presence of new catalysts.

Prior to this invention it has been known to prepare acrylic acid or its derivatives by reacting carbon monoxide with acetylene and water or compounds with reactive hydrogen atoms, as for example alcohols, carboxylic acids, primary or secondary amines, and mercaptans etc. in the presence of carbonyl-forming metals or their compounds, in particular nickel halides, at elevated temperature and under pressure.

It is also already known to use for this reaction as catalysts complex compounds of nickel which contain, besides halogen, phosphonium, arsonium or stibonium compounds. It is furthermore known to use as catalysts complex nickel compounds which contain tertiary amines or ammonium compounds derived therefrom. It has also already been proposed to carry out the reaction of acetylene, carbon monoxide and compounds with removable hydrogen atoms in the presence of complex compounds of nickel salts with carboxylic acid amides.

It is an object of the present invention to increase the speed of reaction in the known process by the use of a new catalyst. A further object of the invention consists in carrying out the reaction in shorter reaction times without the yields of acrylic acid or its functional derivatives being reduced, i. e. to produce better space-time yields.

We have now found that these advantages can be achieved and a solution found to the problem by carrying out the synthesis of acrylic acid and its functional derivatives, such as esters, amides and anhydrides with other carboxylic acids, from acetylene, carbon monoxide and a compound with a removable or reactive hydrogen atom, such as alcohols, primary or secondary amines or carboxylic acids, in the presence of a catalyst which consists of a complex compound which has been formed from a halide selected from the group consisting of chloride, bromide and iodide, a carbonyl-forming metal selected from the group consisting of nickel, cobalt and iron and at least one organic complex-forming compound containing two elements of the 5th to 6th main groups of the periodic system, the complex-forming compounds having the general formula $X-CH_2-(CH_2)_n-Y$ in which X and Y are radicals containing the hetero atom selected from the group consisting of hydroxy, alkoxy, aryloxy, acyl, carbalkoxy or thiol groups or one which has the free valency at a hetero atom of an aliphatic mercaptan, thiophenol, a thiocarboxylic acid or a primary or secondary amine, phosphine or stilbene, and $n$ represents a whole number, which may assume the value zero, one or two.

Suitable organic complex-forming compounds to be used together with the halides of the carbonyl-forming metals of the iron group of the periodic system are for example 1,2 - dimethylmercaptoethane, 1,2 - diethylmercaptoethane, 1,3 - dimethylmercaptopropane, dimethylaminoacetone 4-dimethylaminobutanone-(2), N,N'-tetramethylethylene diamine, N,N'-tetramethylpropylene diamine, 1-ethylmercapto-2-dimethylaminoethane, 1-ethylmercapto-3-dimethylamino-propane, 1-ethoxy-2-dimethyloaminoethane, 1 - ethylmercapto - 2 - ethoxy - ethane and beta-ethylmercaptodiethyl ether. Acetyl acetone, acetonyl acetone, acetoacetic acid and levulinic acid ester can also be used.

As halides of the carbonyl-forming metals of the iron group there are especially suitable the bromides and iodides of nickel and cobalt. The chlorides of the said metals can also be used. Instead of nickel and cobalt halides we can also use other salts of the carbonyl-forming metals provided they are used together with free or combined halogen, as for example as alkyl halide or as a halide of a metal not forming a carbonyl or as a non-metal halide.

The complex salts may be prepared in a very simple way, for example by mutual heating of the components or by vigorous mixing, for example by shaking concentrated aqueous solutions of nickel halide with at least one of the complex-forming organic compounds. The complex salts are in general strongly colored, green to blue crystalline compounds which usually contain 2 to 3 molecules of the organic complex-forming compound to 1 molecule of the metal halide. To carry out the process, there may be used, instead of the complex compounds themselves also their solutions, for example, in the liquid initial materials such as the alcohols, carboxylic acids or the other compounds with the removable hydrogen atom as far as these compounds are liquid or special organic solvents, such as hydrocarbons, ethers or ketones. It is, however, not necessary to use the ready-made complex compounds themselves, but the components forming the complex compounds may be added as such or in solution to the initial mixture so that the complex compound can be produced during the synthesis. The organic complex-forming compounds may also be used in admixture with one another. Mixtures of various halides of the carbonyl-forming metals are also suitable, for example, mixtures of nickel bromide and iodide. It is not necessary to add the components which form the complex compounds in exactly the stoichiometrical amounts. On the contrary the proportions of the components may vary within wide limits. Thus, for example, the ratio between the carbonyl-forming metal and the complex-forming compound may range between 1:20 and 20:1. The catalyst or the halide of the carbonyl-forming metal may also be applied on carriers, such as pumice or silica gel. The catalysts are preferably used for the reaction in an amount of 0.5 to 35% by weight, advantageously 1 to 10% by weight, with reference to the compound with removable hydrogen atom.

The conditions for carrying out the reaction correspond to those which are usual for the acrylic acid synthesis according to W. Reppe. For example it is suitable to work at temperatures between 100° and 250° C., advantageously 150° to 200° C. and pressures of 5 to 100 atmospheres. The reaction may be carried out for example by introducing the catalyst and the compound with a removable hydrogen atom for example a straight-chain or long-chain saturated or unsaturated monohydric primary, secondary or tertiary or a polyhydric alcohol of the aliphatic, aromatic, araliphatic or cycoaliphatic series or an enolizable ketone, into a pressure-tight vessel and forcing into the vessel such amounts of acetylene and carbon monoxide at room or moderately elevated temperature that upon the subsequent heating to the reaction temperature the desired working pressure is not exceeded. If necessary the desired pressure may be maintained by subsequently forcing in further amounts of the gas mixture. During the reaction the pressure falls so that it is adjusted continuously or periodically by subsequent introduction under pressure. The carbon monoxide and acetylene are preferably used in equal volumetric proportions but it may be advantageous to use one or other gas in excess, for example in a ratio of $CO:C_2H_2=5:1$ to 1:5. The gases may be forced into the vessel consecutively or simultaneously in admixture. The carbon monoxide need not be pure. For example it may contain an inert gas, such as nitrogen, carbon dioxide or hydrogen. Instead of acetylene there may also be used a gas containing acetylene. There may also be co-employed inert solvents, as for example tetrahydrofurane, acetone, dimethyl formamide, N-methylpyrrolidone or butyrolactone, which render possible an increase in the concentration of acetylene and carbon monoxide in the reaction liquid. It is possible to work discontinuously or continuously in the gas phase or in the liquid phase and to carry out the reaction in cocurrent or countercurrent operation. The reaction products may be recovered from the reaction mixture in the usual way, for example by distillation.

The following examples will further illustrate this invention but the invention is not restricted to these examples. The parts specified are parts by weight unless otherwise stated.

Example 1

2.8 grams of the green complex compound of the formula

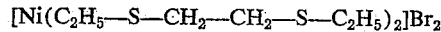

$$[Ni(C_2H_5-S-CH_2-CH_2-S-C_2H_5)_2]Br_2$$

which melts at 155° C. and is obtained by heating 1,2-diethylmercaptoethane and nickel bromide in equivalent amounts, are dissolved in 80 grams of butanol in a 0.25 litre stainless steel shaking autoclave. The air in the autoclave is removed by rinsing with nitrogen and the autoclave then filled by pressing in a gas mixture consisting of equal parts by volume of acetylene and carbon monoxide. It is heated to 185° C., a pressure of 28 atmospheres set up by forcing in the acetylene-carbon monoxide mixture and the pressing in to restore the pressure at 28 atmospheres is repeated at half-hourly intervals. After 12 hours, 134 atmospheres or 27 grams of the gas mixture have been absorbed. The reaction mixture consists of 107 grams which contains, besides unreacted butanol, 68.3 parts of acrylic acid butyl ester.

The following table shows the results obtained under otherwise identical conditions in the same period of time with corresponding amounts of a series of other complex compounds which have been produced under the reaction conditions during the reaction, using 1.2 parts of nickel bromide together with any of the amounts by weight of the complex-forming compounds specified in the table as a catalyst:

| Example | Complex-forming compound | Parts | Gas absorption in atmospheres after 12 hours | Reaction mixture in grams | Yield of butyl acrylate in grams |
|---|---|---|---|---|---|
| 2 | 1,2-diethylmercaptoethane | 2 | 115 | 111 | 65.4 |
| 3 | N,N'-tetramethylethylene diamine | 2 | 108 | 107 | 54 |
| 4 | beta-ethylmercaptodiethyl ether | 3 | 92 | 92 | 42.5 |
| 5 | dimethylaminoacetone | 2 | 89 | 81 | 41 |

Example 6

0.6 part of nickel bromide is dissolved by heating in 1.8 parts of 1,2-diethylmercaptoethane, the resultant green melt is taken up in 80 parts of 99% ethanol and the mixture reacted at 45 atmospheres in the manner described in Example 1. After 12 hours, 110 atmospheres or 26 parts of the gas mixture have been absorbed. 51.2 parts of ethyl acrylate are obtained from the reaction mixture by distillation.

Example 7

1.2 parts of nickel bromide, 2.5 parts of 1-ethylmercapto-3-(dimethylamino)-propane, 43 parts of 99% ethanol and 43 parts of acetone are reacted in the manner described in Example 1 with acetylene-carbon monoxide (1:1) at 45 atmospheres. After 12 hours, 273 atmospheres have been absorbed. The reaction mixture amounts to 119 parts and contain 54.5 parts of ethyl acrylate.

By using 2.2 parts of 1-ethylmercapto-2-dimethylamino-ethane as the complex-forming compound instead of 1-ethyl-mercapto-3-(dimethylamino)-propane, the reaction mixture amounts to 118 parts after a gas absorption of 268 atmospheres. By distillation, 49.8 parts of ethyl acrylate are obtained therefrom.

If the reaction takes place with the employment of 2.5 parts of beta-dimethylaminodiethyl ether instead of 1-ethyl-mercapto-3-(dimethylamino)-propane, the reaction mixture after a gas absorption of 136 atmospheres amounts to 113 parts. By working up, 30.5 parts of ethyl acrylate are obtained.

Example 8

1.2 parts of nickel bromide, 2 parts of 1,2-diethylmercaptoethane and 80 parts of methanol are reacted in the way described in Example 1 with acetylene-carbon monoxide (1:1) at 45 atmospheres. After 12 hours, 122 atmospheres of the gas mixture have been absorbed. The yield is 127 parts and contains 44.5 parts of methyl acrylate.

Example 9

1.4 parts of the complex compound of the formula $[Ni(C_2H_5-S-CH_2-CH_2-S-C_2H_5)_2]Br_2$ are dissolved in 70 parts of acetone and 7 parts of water and reacted as described in Example 1 with acetylene-carbon monoxide (1:1) at 45 atmospheres at 185° C. After the absorption of 115 atmospheres of the gas mixture, the yield amounts to 112 parts. By distillation, 29.2 parts of acrylic acid are obtained.

The following table shows the results obtained under the same conditions with other complex salts which have been formed by the addition of a 50% nickel bromide solution and a complex-forming compound, in 70 parts of tetrahydrofurane and 10 parts of water:

| Example | Complex forming compound (c) | Parts of (c) | Parts of NiBr₂ solution, 50% | Gas absorption in atmospheres | Yield in parts | Acrylic acid in parts |
|---|---|---|---|---|---|---|
| 10 | 1,2-diethylmercaptoethane | 1.0 | 1.2 | 116 | 117 | 31 |
| 11 | 1,3-dimethylmercaptopropane | 1.0 | 1.2 | 112 | 105 | 25.2 |
| 12 | N,N'-tetramethylethylene diamine | 2.0 | 2.4 | 103 | 111 | 28.3 |
| 13 | 1-ethylmercapto-2-dimethylaminoethane | 1.0 | 1.2 | 87 | 102 | 17.2 |
| 14 | dimethylaminoacetone | 1.0 | 1.2 | 92 | 103 | 20.6 |
| 15 | beta-ethylmercaptodiethyl ether | 1.0 | 1.2 | 90 | 101 | 18.1 |

Example 16

In a 0.25 liter shaking autoclave of stainless steel 50 grams of methanol, 0.1 gram of nickel bromide and 1.5 grams of acetyl acetone are treated with an acetylene/carbon monoxide gas mixture in a ratio of 1:1 at a temperature of 160° C. and a pressure of 45 atmospheres for 24 hours. At the end of each hour the pressure in the autoclave is restored to 45 atmospheres by pressing in the required amount of acetylene/carbon monoxide gas mixture and this is repeated until no further drop of temperature occurs. There are obtained 76 grams of a completely clear, pale yellow reaction mixture which contains 33% by weight (=25 grams) of acrylic acid methyl ester (methyl acrylate).

Using the same conditions and operating in an analogous manner except for the addition of the complex-forming compound, no acrylic acid methyl ester is formed.

Example 17

50 grams of methanol, 0.3 gram of nickel bromide and 1.5 grams of acetyl acetone are treated with an acetylene/carbon monoxide gas mixture as described in Example 16. After 24 hours 68 grams of a light-brown product are obtained which has an ester number of 274 and traces of black spots. The reaction product has an acrylic acid methyl ester contents of 42% by weight which corresponds to 29 grams.

Using the same reaction conditions as aforesaid except for the addition of acetyl acetone, the reaction mixture obtained only contains 1.3 grams of acrylic acid methyl ester.

Example 18

In a 0.25 liter shaking bomb of stainless steel 50 grams of 96% ethanol, 0.1 gram of nickel bromide and 0.75 gram of acetyl acetone are treated with a mixture of equal parts by volume of acetylene and carbon monoxide gas at a temperature of 190° C. and a pressure of 45 atmospheres for 6 hours in the manner described in Example 16. 58 grams of a reaction mixture are obtained which contains 22% by weight (=13 grams) of acrylic acid ethyl ester.

Operating in the same way as aforesaid, but without an addition of acetyl acetone as a complex-forming compound, 53 grams of a reaction product are obtained which only contains 2.8% by weight of acrylic acid ethyl ester.

Example 19

50 grams of 96% ethanol, 0.3 gram of nickel bromide and 0.75 gram of acetyl acetone are treated in a 0.25 liter shaking bomb, as in Example 16, with an equal-part-by-volume mixture of acetylene and carbon monoxide gas at a temperature of 190° C. and a pressure 45 atmospheres for 6 hours. The reaction mixture obtained in an amount of 70 grams contains 19 grams (=31% by weight) of acrylic acid ethyl ester.

Example 20

In a 0.25 liter shaking autoclave of stainless steel 50 grams of n-butanol, 0.1 gram of nickel bromide and 0.75 gram of acetyl acetone are treated, in the manner described in Example 16, with an equal-part-by-volume mixture of acetylene and carbon monoxide gas at a temperature of 200° C. and a pressure of 28 atmospheres for 24 hours. The reaction mixture obtained in an amount of 68 grams contains 47 grams (=68% by weight) of acrylic acid butyl ester.

When the reaction is carried out using 0.3 gram (instead of 0.1 gram) of nickel bromide and 1.5 grams (instead of 0.75 gram) of acetyl acetone, 50 grams of acrylic acid butyl ester are obtained from the reaction mixture.

Example 21

A 3 liter capacity reactor provided with an inside lining of stainless steel and fitted with an outside steam jacket heating system is flushed several times with nitrogen and then filled with nitrogen until a pressure of 30 atmospheres is attained. Then the reactor is charged, with the aid of a pressure pump, with a mixture of 972 grams of methanol, 8 grams of nickel bromide and 20 grams of acetyl acetone and slowly heated to 180° C. When this temperature is attained, the nitrogen is replaced gradually with an equal-part-by-volume gas mixture of acetylene and carbon monoxide in such a manner that about 100 liters of gas per hour are exhausted from the reactor and at the same time acetylene/carbon monoxide gas is forced in at a rate that the pressure is raised to 45 atmospheres. Also pumped in per hour is 0.5 liter of a mixture which consists of 972 grams of methanol, 8 grams of nickel bromide and 20 grams of acetyl acetone. From the upper part of the reactor the reaction mixture flows off continuously into a raised pressure catch-pot, whence it is decompressed into a normal pressure catch-pot by way of a condenser. The clear pale-yellow effluent obtained contains about 35% by weight of acrylic acid methyl ester. The space-time yield amounts to an average of 1.3 kilograms of ester per liter of reactor volume a day over a period of one month.

The quantity of the deposits collecting in the reactor sump is extremely small amounting to about 5 grams, for example, after a 50 days duration of the experiment. These deposits are not tacky and most finely particled and, as a result, can be most easily cleared out by discharging sump matter from the sump separator fitted to the bottom end of the reactor. The reactor walls retain their polish throughout the trial.

Example 22

Through a vertically arranged pressure tube of 44 millimeters in diameter and 2,000 millimeters in length, which is lined with stainless steel and fitted with a steam heating system, 600 parts by weight of n-butanol are pumped per hour at a temperature of 200°–210° C. together with 3.6 parts by weight of nickel bromide (=0.6% of the amount of butanol) and 8.4 parts by weight of acetyl acetone (=1.4% of the amount of butanol) as a catalyst. At the same time an equal-part-by-volume gas mixture of acetylene and carbon monoxide is passed through the reaction tube at a pressure of 28 atmospheres co-currently with the butanol/catalyst flow. At the head of the reaction tube 300 liters (N. T. P.) of the gas mixture are exhausted per hour as an off-gas and about 895 parts by weight of the reaction product are withdrawn. The reaction product first passes into a raised pressure catch-pot through an overflow pipe and then, by decompression, into a cooled-down normal pressure catch-pot from which it is discharged. The density of the reaction product is in the neighborhood of 0.906. The effluent product has a brown coloration, but is completely clear. It has an acid number of 3 and a saponification number of 240. It consequently has a butyl ester content of 55%. From 7,200 parts by weight of the butanol/catalyst solution passed through the reaction tube in the course of 12 hours 10,750 parts of reaction product are obtained.

The space-time yield of acrylic acid butyl ester is 4 kilograms per liter of reactor space a day. This space-time yield can be maintained even over a prolonged period of time, say during a 20 days' duration of the experiment. No deposits are formed on the reactor walls even with a 20 days' duration of the experiment.

Example 23

In a 0.25 liter shaking autoclave of stainless steel 50 grams of tetrahydrofuran, 10 grams of water, 1 gram of acrylic acid, 0.2 gram of acetyl acetone, 0.2 gram of hydroquinone and 0.1 gram of nickel bromide are treated with an equal-part-by-volume gas mixture of acetylene and carbon monoxide at a pressure of 45 atmospheres at 170° C. The pressure is maintained constant at this level by pressing in further gas mixture at the end of each hour. The reaction feed stock in the autoclave absorbs 39 atmospheres of gas mixture in the course of 36 hours, 66 grams of a pale-yellow colored reaction product with 9.2 grams of acrylic acid being obtained. The quantity of acrylic acid newly formed thus is 8.2 grams.

Example 24

In a 0.25 liter shaking autoclave of stainless steel 50 grams of methanol, 0.3 gram of nickel bromide and 0.8 gram of benzoyl acetone are treated with an equal-part-by-volume gas mixture of acetylene and carbon monoxide at a temperature of 180° C. and a pressure of 45 atmospheres for 24 hours. The pressure is maintained constant by pressing in further gas mixture at the end of each hour. The reaction mixture is obtained in an amount of 56 grams which contain 30% (=17 grams) of acrylic acid methyl ester.

When operating in the aforesaid manner but in the absence of benzoyl acetone, the reaction product is obtained only in an amount of 40 grams with only 1 gram of acrylic acid methyl ester.

What we claim is:

1. In a method of manufacturing acrylic acid or its lower alkyl esters by the catalytic interaction of acetylene, carbon monoxide and a compound having a removable hydrogen atom, selected of the group consisting of water and a lower aliphatic alcohol at a temperature between 100 and 250° C. and under a pressure of from 5 to 100 atmospheres, in the presence of a halide-containing complex-nickel-catalyst the improvement which comprises carrying out said reaction with a complex-nickel-catalyst which is formed from nickel bromide and at least one hydrocarbon complex-forming compound containg 2 elements selected from the group consisting of oxygen, nitrogen and sulfur having the formula $$X-CH_2-(CH_2)_n-Y$$

in which X and Y are radicals selected from the group consisting of lower alkoxy, lower alkanoyl, lower alkyl mercapto, di-lower alkyl amino and benzoyl and $n$ represents a number selected from the group consisting of zero, one and two.

2. The process as claimed in claim 1 wherein the complex nickel catalyst is allowed to form during the reaction by adding the catalyst components to the initial mixture.

3. The process as claimed in claim 1 wherein the hydrocarbon complex-forming compound used is 1,2-diethyl-mercaptoethane.

4. The process as claimed in claim 1 wherein the hydrocarbon complex-forming compound used is 1,3-dimethyl-mercaptopropane.

5. The process as claimed in claim 1 wherein the hydrocarbon complex-forming compound used is N,N'-tetramethylethylenediamine.

6. The process as claimed in claim 1 wherein the hydrocarbon complex-forming compound used is dimethylaminoacetone.

7. The process as claimed in claim 1 wherein the hydrocarbon complex-forming compound used is acetylacetone.

References Cited in the file of this patent

UNITED STATES PATENTS 2,738,364   Reppe et al. _____ Mar. 13, 1956

FOREIGN PATENTS 854,948   Germany _____ Nov. 10, 1952
1,117,188   France _____ Feb. 20, 1956

OTHER REFERENCES

Copenhaver et al.: "Acetylene and Carbon Monoxide Chemistry" (1949), pp. 259–65, 297–8.

Merck Index, 6th edition, 1952 (p. 11).